UNITED STATES PATENT OFFICE.

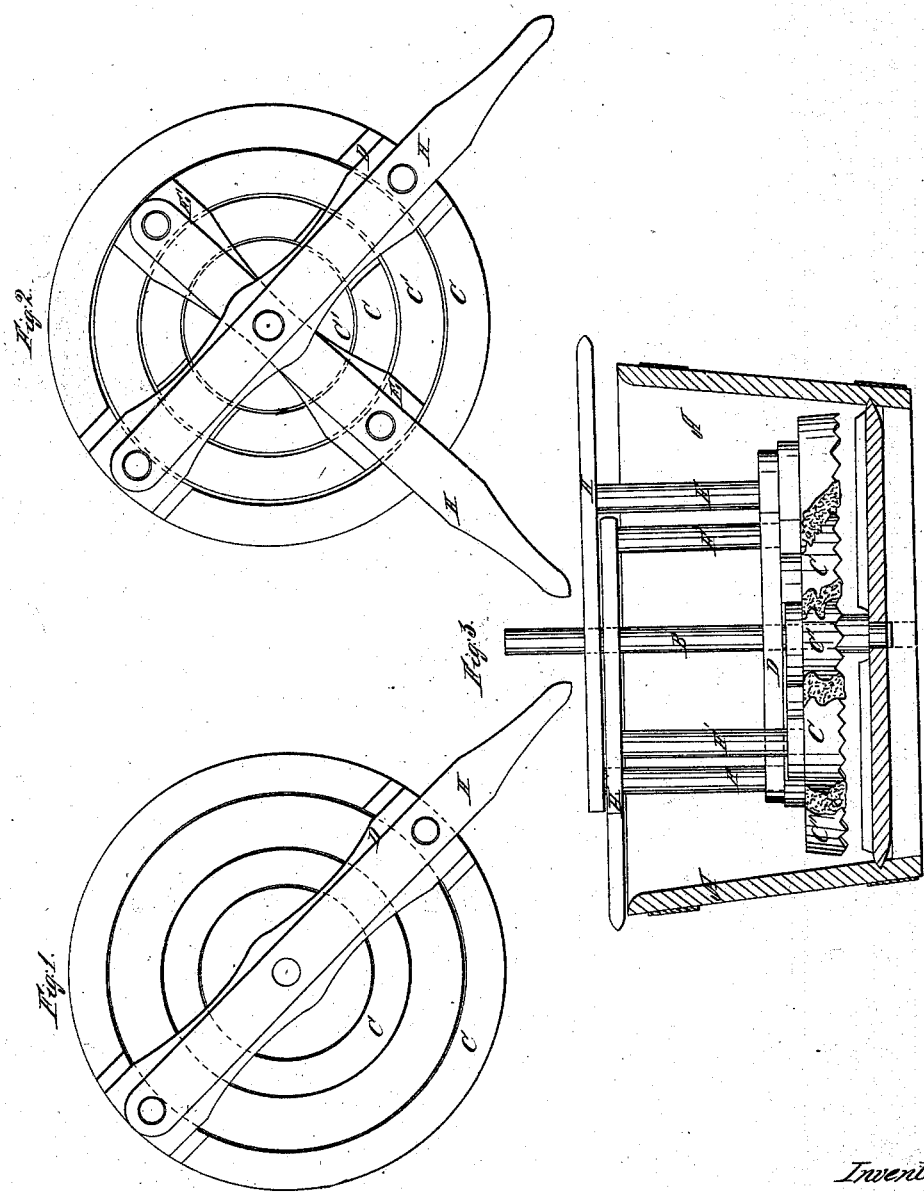

GEORGE W. TOLHURST, OF LIVERPOOL, OHIO.

WASHING-MACHINE.

Specification of Letters Patent No. 26,384, dated December 6, 1859.

*To all whom it may concern:*

Be it known that I, GEORGE W. TOLHURST, of Liverpool, in the county of Medina and State of Ohio, have invented a new and useful Improvement in Machines for Washing Clothes; and I do hereby declare that the following is a full and exact description thereof, reference being had to the accompanying drawings and to the letters of reference marked thereon.

The nature of my invention consists in forming a follower of a washing machine of round rings (or hoops) and connecting each alternate ring to be worked with one handle, and connecting each of the remaining rings by themselves to be worked with another handle, for the purpose of rubbing the clothes in opposite directions at one time, which compound motion prevents the clothes from being rolled up in wads which is very detrimental to the cleaning of the articles operated on.

To enable others skilled in the art to make and use my invention, I will proceed to describe its construction and operation.

I construct my washing machines in the form of a common tube as shown at A, Fig. 3, in the accompanying drawings; in the center of said tub I secure a standard (or post) marked B, Fig. 3. I then take a piece of hard wood plank one inch and a half thick, and of sufficient size to strike the required diameter and saw the same into rings of about 2 or 3 inches in width as shown at C, C, C', C', Figs. 1, 2, and 3, the two alternate rings being attached together by the crosspiece marked D, Fig. 1; said Fig. 1, represents one half of the follower to more clearly show its construction. Fig. 2, shows the rubber complete the 2 rings that were lacking in Fig. 1, being here represented the rings C', C', are attached together by means of the short crosspieces E, and E'; to the ends of each of these crosspieces are secured short posts marked F, F, and F', F', as seen in Fig. 3; to the upper end of said posts I secure two handles marked H, H, Figs. 1, 2, and 3; in or near the center of the said handles and crosspieces I bore a hole through which hole I pass the standard, B, as shown in Fig. 3, and the machine is ready for use, one handle being taken in each hand and move them to and from each other, which prevents the clothes from being rolled up in heaps, as is otherwise the case with this kind of washing machine.

Having thus described my improved washing machine I wish it understood that I do not claim a round follower working on an upright standard as I am aware they have been long used. But

What I claim as new and desire to secure by Letters Patent is—

Constructing the round follower of washing machines of two sets of rings (or hoops) and furnishing each set of rings with a handle so that the surface that comes in contact with the clothes can move in opposite directions at one time and this I claim when the same is arranged for operation in the manner and for the purpose as herein described and set forth for the purpose specified.

GEORGE W. TOLHURST.

Witnesses:
MARK WOODWORTH,
F. E. WOODWORTH.